June 13, 1961 MASAO FUKATA 2,988,713
CONNECTION SYSTEM OF MULTIPLE-TUNED COUPLED CIRCUITS
Filed March 22, 1957 9 Sheets-Sheet 1
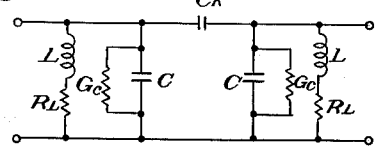
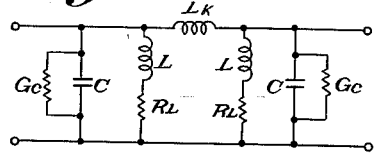
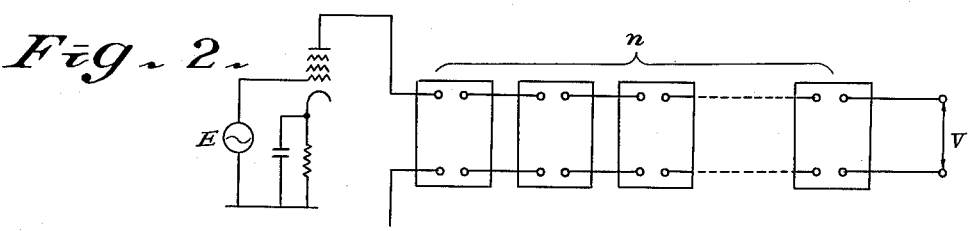
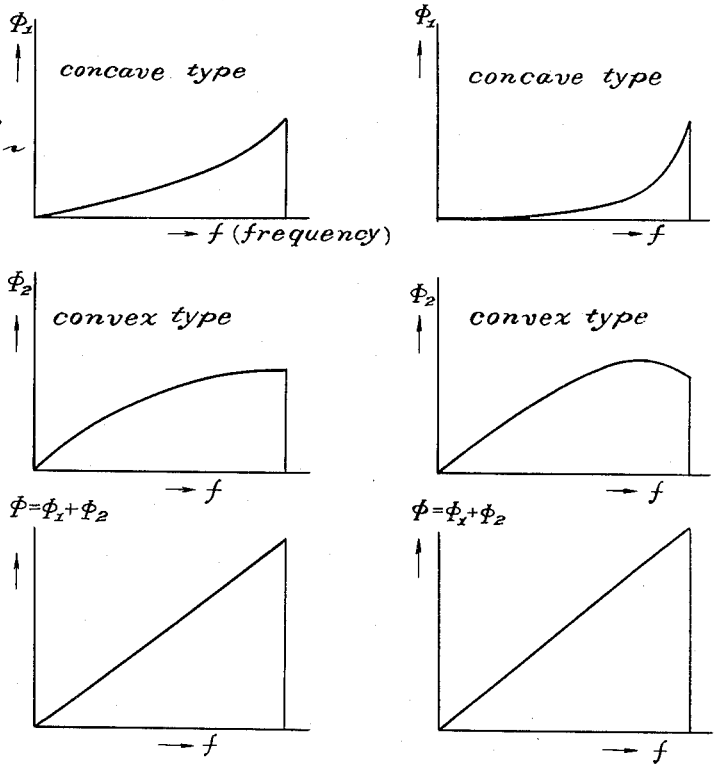

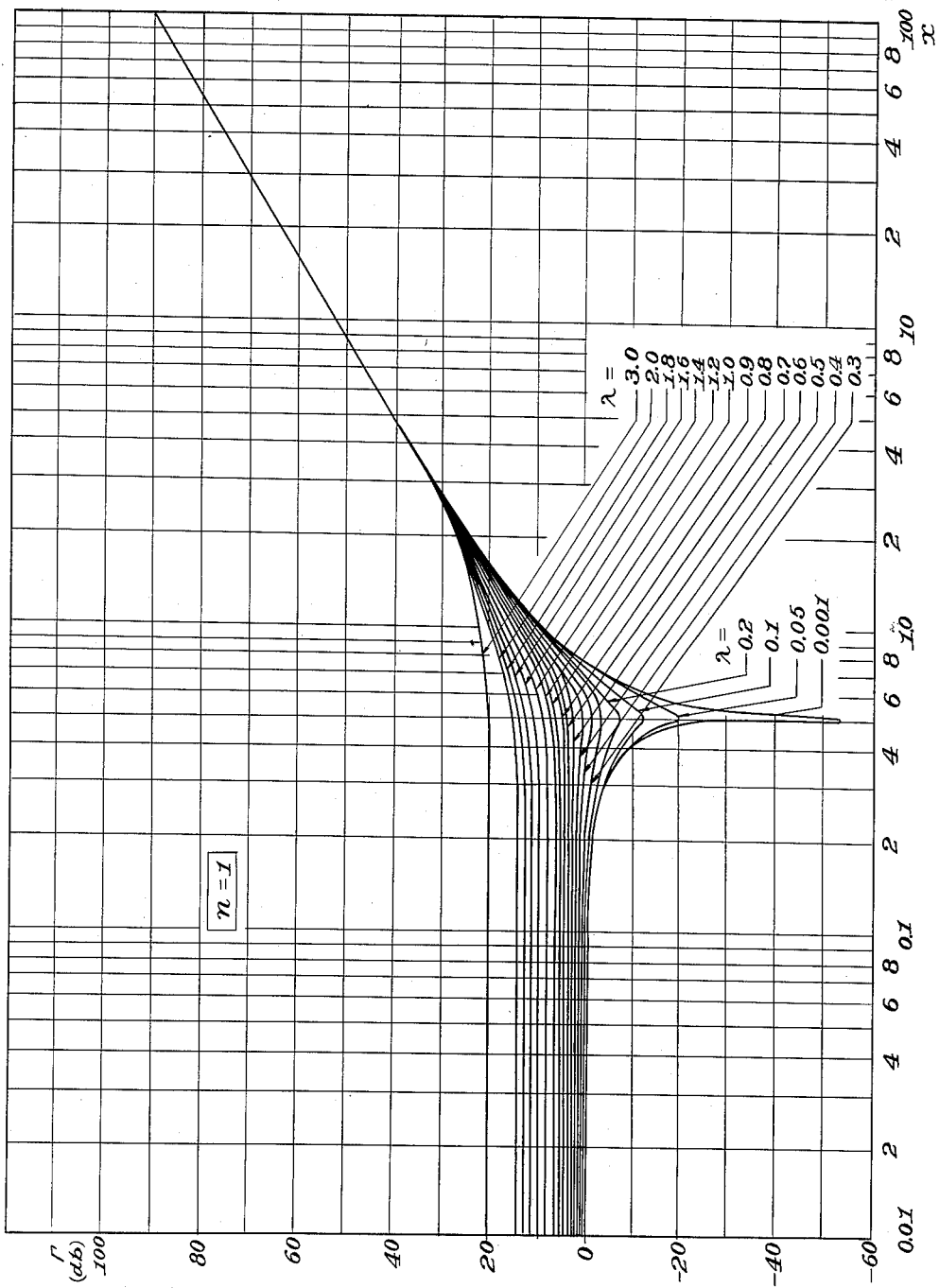

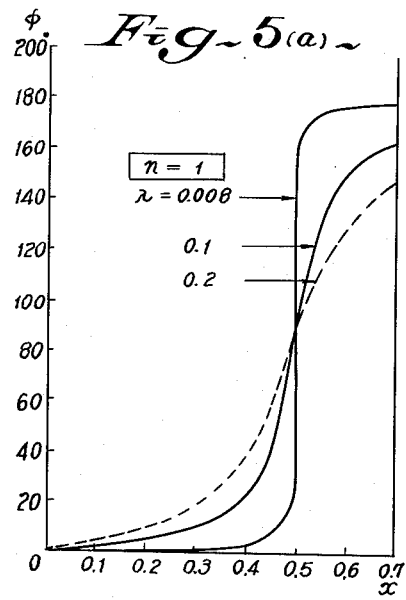
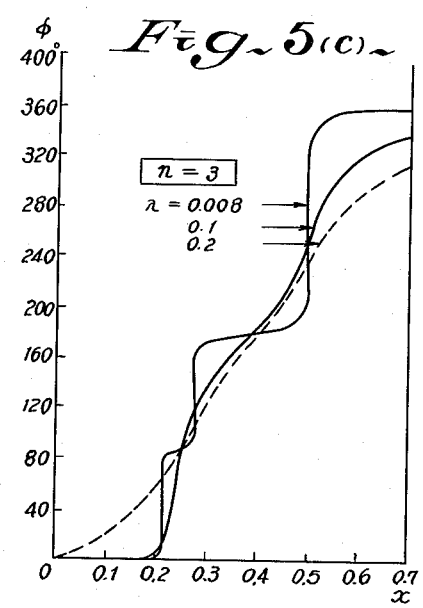
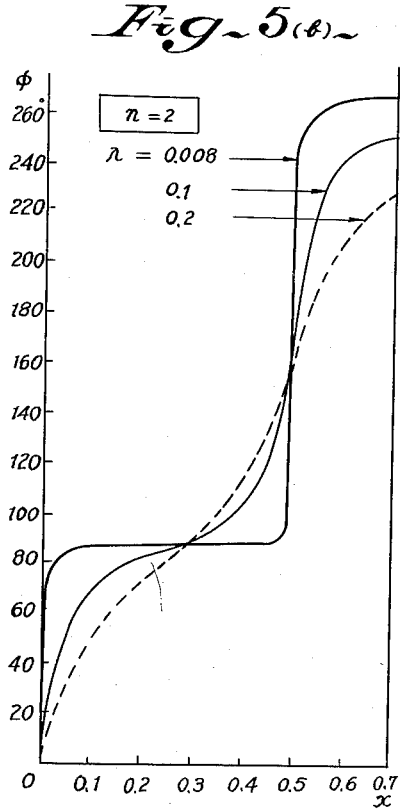
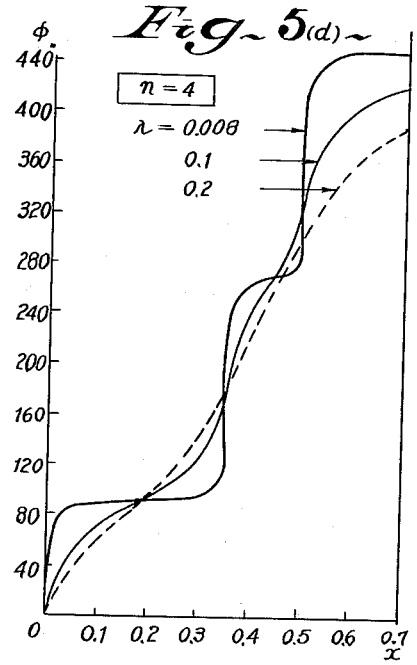

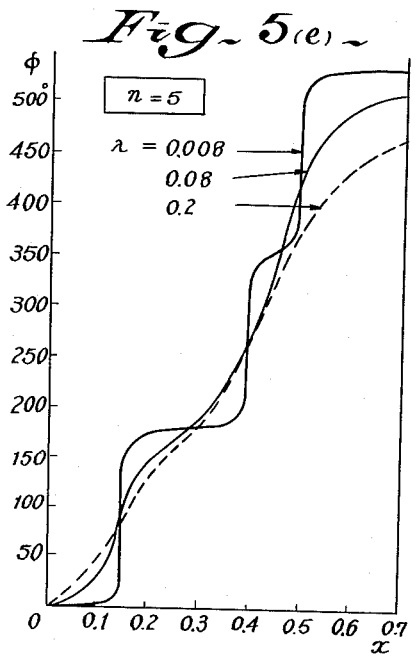
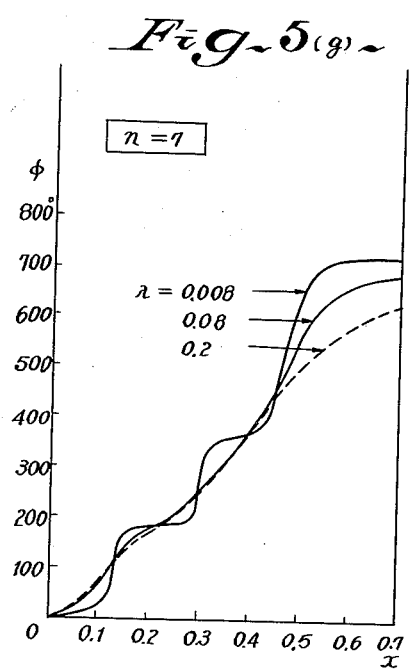
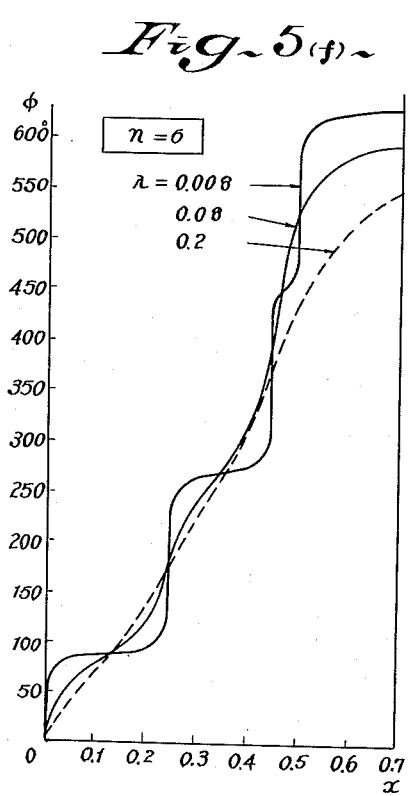
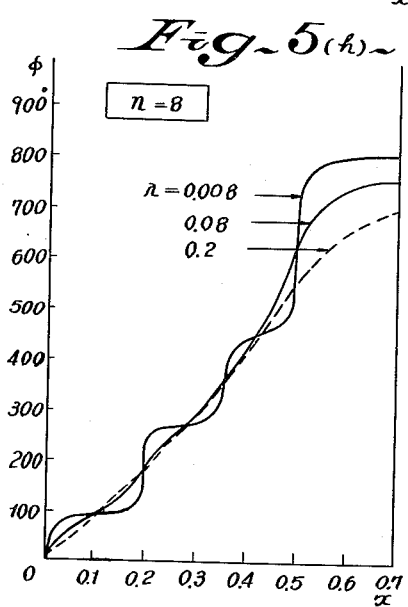

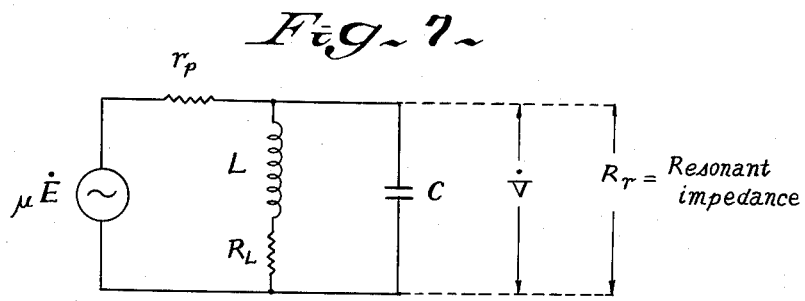
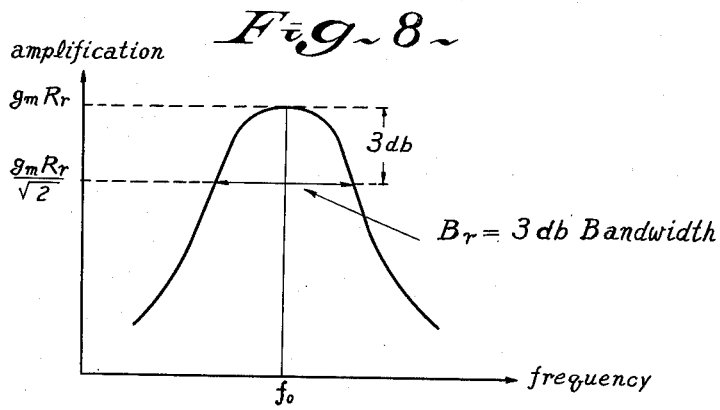
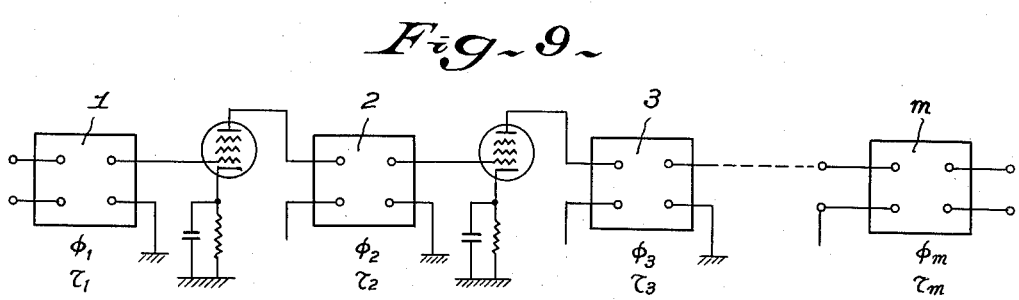

United States Patent Office 2,988,713
Patented June 13, 1961

2,988,713
CONNECTION SYSTEM OF MULTIPLE-TUNED COUPLED CIRCUITS
Masao Fukata, Mitaka-shi, Tokyo-to, Japan, assignor to Kokusai Denki Kabushiki Kaisha, Tokyo-to, Japan, a Japanese limited liability company
Filed Mar. 22, 1957, Ser. No. 647,880
Claims priority, application Japan Mar. 26, 1956
1 Claim. (Cl. 333—70)

This invention relates to a transmission works and more particularly to a network of multiple-tuned coupled circuits or filter sections, in which the phase characteristics relative to frequencies vary in accordance with a linear proportionality within the necessary transmission band.

The so-called multiple-tuned coupled filter network can be regarded as the network obtained by cascade connection of double-tuned coupled sections of $n$ number. Such a network is particularly suitable for high frequency use in which ohmic losses and interaction of the circuit elements are remarkably large. However, the phase characteristics of the conventional amplifier including the multiple-tuned type coupled network is not always satisfactory.

Therefore, a principal object of the present tinvention is to make the overall phase characteristics of the circuits fairly linear within highest and lowest frequency within the pass band as well as to improve their amplitude characteristics.

The principal objects and other objects of this invention have been effectuated by combination, through coupling elements, of at least one filter network which is composed of double-tuned coupled sections of odd number with at least one circuit which is composed of double-tuned sections of even number, each of the said double-tuned coupled sections being an elemental unit of the multiple-tuned coupled filter circuit or network.

The said combination is based on an analytic result relating to amplitude characteristics and phase characteristics of the multiple-tuned network.

The present invention includes an additional characteristic idea in that one single-tuned section is connected in the multiple-tuned network which is composed of double-tuned sections of even number.

The novel features of the invention can be better understood from the following detailed description, when taken together with the accompanying drawings, in which:

FIGS. 1(a) and (b) are schematic connection diagrams of two kinds of double-tuned filter sections.

FIG. 2 is a schematic connection diagram of an amplifier circuit including a multiple-tuned filter circuit as its anode load.

FIGS. 3(a), (b) and (c) are some examples of the amplitude characteristic curves of the circuit in FIG. 2.

FIGS. 4(a), (b), (c) are some examples of the phase characteristic curves of the circuit in FIG. 2.

FIGS. 5(a), (b), (c), (d), (e), (f), (g) and (h) are some examples of the phase characteristic curves of the circuit in FIG. 2, in the case of variation of the number of elemental units which compose the multiple-tuned coupled circuit.

FIG. 6 illustrates characteristic curves for describing the principle of this invention.

FIG. 7 is a schematic connection diagram of a single-tuned circuit.

FIG. 8 is a resonant curve of the circuit in FIG. 7.

FIG. 9 is a schematic connection diagram of an actual example of this invention.

Prior to a concrete description of this invention, the phase characteristics and amplitude characteristics of a so-called multiple-tuned network will be described. Moreover, it will be understood that the term multiple-tuned coupled circuits as used in this disclosure corresponds to multi-mesh coupled circuits and the term couple-tuned coupled circuits is the equivalent of two-mesh isochronous and equi-dissipative tuned coupled circuits.

In FIG. 1(a) and FIG. 1(b) are shown, respectively, the elemental units or sections of the multiple-tuned network of static coupling type and electromagnetic coupling type, in which the coil L includes a series resistance $R_L$ and the condenser C includes a parallel conductance $G_c$. These networks form band pass filters and we assume that the middle frequency, upper cut-off frequency and lower cut-off frequency are represented, respectively by $f_0$, $f_2$ and $f_1$. The percentage bandwidth $\gamma$, percentage off-resonance $\gamma_x$, loss factor $\delta$, characteristic index $\lambda$ and off-resonance index $x$ are defined by the following equations:

$$\gamma = \frac{f_2 - f_1}{f_0} = \frac{B_0}{f_0}$$

$$\gamma_x = \frac{f - f_0}{f_0}$$

$$\delta = \frac{R_L}{2\pi f_0 L} + \frac{G_c}{2\pi f_0 C}$$

$$\lambda = \frac{\delta}{\gamma}$$

$$x = \frac{\gamma_x}{\gamma} = \frac{f - f_0}{B_0}$$

The amplification factor $$\left(\dot{A} = \frac{\dot{V}}{\dot{E}}\right)$$

of an amplifier circuit such as shown in FIG. 2, the said circuit including, as an anode load, a multiple-tuned network consisting of such cascaded elemental units or sections of $n$ number as shown in FIG. 1(a) or FIG. 1(b), will be represented by the following Equation 1.

$$\dot{A} = |A|\epsilon^{-j\phi} \quad (1)$$

where, $$|\dot{A}| = \frac{g_m R_0}{4\sqrt{(1+\lambda^2-4x^2)^2+(4\lambda x)^2}\sqrt{\sinh^2 n\alpha + \sin^2 n\beta}} \quad (2)$$

$$\phi = \frac{1}{2}\tan^{-1}\frac{4\lambda x}{1+\lambda^2-4x^2} + \tan^{-1}\frac{\tan n\beta}{\tanh n\alpha} \quad (3)$$

$$\alpha = \sinh^{-1}\sqrt{\frac{-(1-\lambda^2-4x^2)+\sqrt{(1-\lambda^2-4x^2)^2+4\lambda^2}}{2}}$$

$$\beta = \sin^{-1}\sqrt{\frac{1-\lambda^2-4x^2+\sqrt{(1-\lambda^2-4x^2)^2+4\lambda^2}}{2}}$$

$g_m$ = mutual conductance of amplifier tube.
$R_0$ = nominal impedance.

Figure 3B:
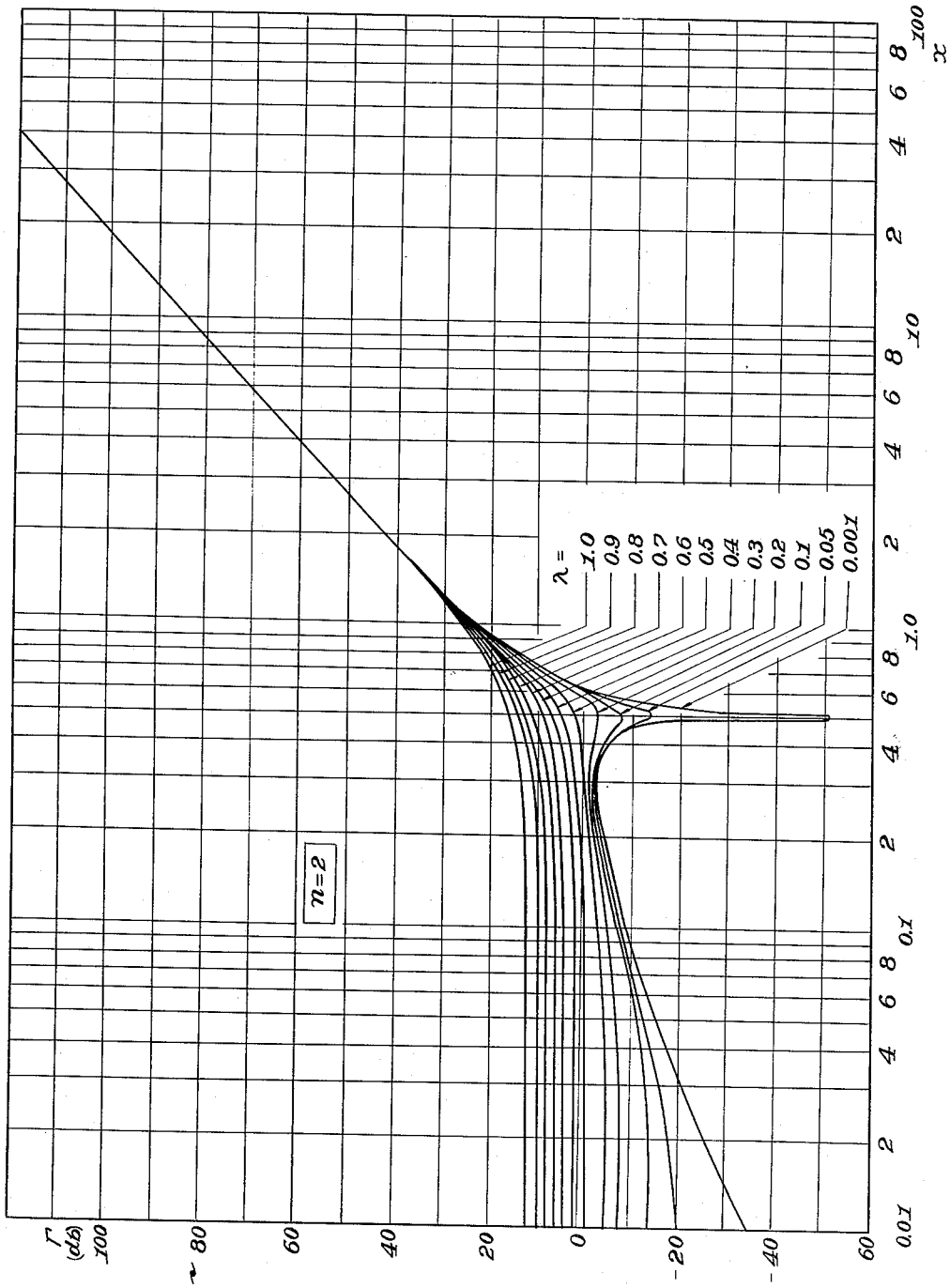
Figure 4A:
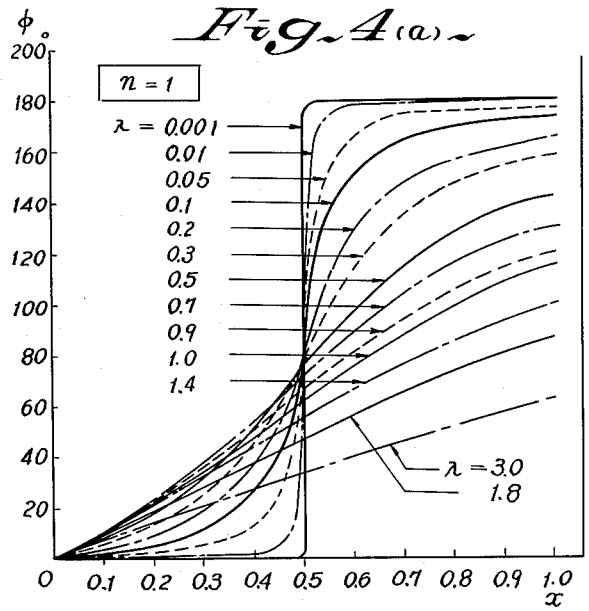

If the characteristic curves obtained by the Equations 2 and 3 are plotted by taking $\lambda$, $x$, $\Gamma = 20 \log |\dot{A}|/g_m R_0$ and $\phi$, respectively, as the parameter, independent variable, dependent variable and dependent variable, amplitude characteristics as shown in FIGS. 3(a), (b), (c) and phase characteristics as shown in FIGS. 4(a), (b), (c) will be obtained.

As will be seen from the characteristics in FIGS. 4(a), (b) and (c), the phase characteristics of the amplifier including a multiple-tuned coupled circuit as its anode load includes, when the parameter $\lambda$ is small, any phase distortion because of the nonlinear characteristic thereof. However, with increase of the parameter $\lambda$, the phase characteristics approximately approach linear characteristics within the pass band ($x \leq 0.5$), but when the parameter $\lambda$ becomes sufficiently large, as will be seen from FIGS. 3(a), (b) and (c), the insertion loss increases within the pass band ($x \leq 0.5$) and selectivity becomes inferior within the attenuation band ($x > 0.5$), which results in inferior amplitude characteristics. As a result, it can be seen that the amplitude characteristics become inferior within the range of characteristic index corresponding to excellent phase characteristics, and that the condition suitable for phase characteristics is contrary to that suitable for the amplitude characteristics.

As described above, the phase characteristics of the amplifier including a multiple-tuned coupled network is not always satisfactory and necessitates a phase compensation.

However, in the conventional phase compensating method, it is conventional to use a circuit in which the amplitude characteristic is independent of frequency and only the phase characteristic varies.

The principle of this invention is originally different from the above-mentioned system and consists in that the networks are combined in such a manner that their amplitude characteristics are not independent of frequency, their amplitude variations are compensated mutually within the pass band so as to make amplitude deviation small, and their selectivities are superposed within the attenuation band, whereby both the phase and amplitude characteristics are caused to be improved within the pass band.

The basic principle of this invention will be explained in the following.

Generally, for obtaining flat characteristics of delay time relative to frequencies in an electric circuit, the phase characteristics thereof must be linear.

Now, in the following, we obtain the conditions which make the characteristics of the overall delay time flat by connecting the sections of $m$ number as in the case of the connection in FIG. 9. If it is assumed that in FIG. 9, the phases of the circuits are, respectively, $\phi_1, \phi_2, \phi_3 \ldots \phi_m$ and the delay times of the circuits are, respectively, $\tau_1, \tau_2, \tau_3 \ldots \tau_m$, the following equations will be obtained.

$$\tau_1 = \frac{\partial \phi_1}{\partial f}$$

$$\tau_2 = \frac{\partial \phi_2}{\partial f}$$

$$\tau_m = \frac{\partial \phi_m}{\partial f}$$

Consequently, for establishing the following relation $$\tau_1 + \tau_2 + \tau_3 + \ldots \tau_m = \text{constant}$$

the following condition must be established.

$$\frac{\partial \phi_1}{\partial f} + \frac{\partial \phi_2}{\partial f} + \frac{\partial \phi_3}{\partial f} + \ldots \frac{\partial \phi_m}{\partial f} = \text{constant}$$

That is $$\frac{\partial (\phi_1 + \phi_2 + \phi_3 + \ldots \phi_m)}{\partial f} = \text{constant}$$

As a result, for making the delay time characteristics flat by the combination of several networks, only the resultant phase characteristic obtained by superposing the phase characteristics of all the networks should be linear without necessitating the linear state of the phase characteristic of each individual network.

FIG. 6 relates to the characteristic curves showing the case in which the resultant delay time characteristic is made flat by combination of two circuits the phases of which are, respectively, $\phi_1$ and $\phi_2$. That is, the said curves in FIG. 6 indicate that linear phase characteristics can be obtained by combination of a concave type characteristic ($\phi_1 \sim f$) and a convex type characteristic ($\phi_2 \sim f$), $f$ being frequency.

As will be seen from this FIG. 6, it is possible to obtain an infinite number of combinations of characteristics ($\phi_1 \sim f$) and characteristics ($\phi_2 \sim f$) by varying concave and convex curvatures.

On the other hand, when the number of double-tuned coupled sections which are elemental units of a multiple-tuned coupled network is taken as $n$ and the characteristics of phase $\phi$ relative to off-resonance index $x$, in the case of $n = 1, 2, 3, 4, 5, 6, 7$ and $8$, are calculated within the range of relatively small value of the characteristic index $\lambda$ (for instance, $\lambda = 0.008, 0.1, 0.2$), the characteristics as shown in FIGS. 5(a)~FIG. 5(h) will be obtained In FIGS. 5(a)~5(h), it will be be seen that when the parameters are more approximately same, the curve of the characteristic ($\phi - x$) in the case of even number of $n$ takes the form which is the reverse of that in the case of odd number of $n$ within relatively wide range, in such a manner that the concave part and convex part appear opposite each other.

This invention is based on the above phenomenon. That is, this invention relates to a system capable of making the overall phase characteristic almost linear by combination of the sections of even number and the sections of odd number. Through such combination, the amplitude characteristics, when the parameters $\lambda$ are approximately equal, can be compensated within the pass band ($x \leq 0.5$) and the selectivities of the networks can be superposed within the attenuation band ($x > 0.5$) without relation to the values of the parameters $\lambda$.

In the following will be described the result of our theoretical study; that is, the result that a single-tuned circuit may be regarded as a special case of the multiple-tuned coupled network in which $n$ is an even number.

If it is assumed that the 3 db bandwidth of the resonant curve of a single-tuned circuit as shown in FIG. 7 is $B_r$ as shown in FIG. 8, the equation $$\left(B_r = \frac{f_0}{Q}\right)$$

will be established, Q being the quality factor of the single-tuned circuit.

The circuit obtained by coupling two of the said single-tuned sections corresponds to a unit of the multiple-tuned coupled circuit. Next, the relation between the bandwidth $B_r$ of the single-tuned circuit and the theoretical bandwidth $B_0$ of the above defined multiple-tuned coupled circuit will be given by the following equation.

$$B_r = \frac{f_0}{Q} = \left(\frac{\delta f_0}{B_0}\right) B_0 = \frac{\delta}{\gamma} B_0$$

i.e. $$B_r = \lambda B_0 \qquad (4)$$

where Q is $1/\delta$.

On the other hand, it can be proved that between the resonant impedance $R_r$ of the single-tuned section in FIG. 7 and the nominal impedance $R_0$ of the multiple-tuned section, there is the following relation.

$$R_r = \frac{R_0}{\lambda} \qquad (5)$$

According to use of the Equations 4 and 5, it may be defined that the theoretical bandwidth $B_0$ and the nominal impedance $R_0$ defined in connection with the multiple-tuned coupled circuit represent, respectively, the theoretical bandwidth and the nominal impedance relating to the single-tuned circuit when the single-tuned circuit is used in combination with the multiple-tuned coupled circuit having characteristic index $\lambda$. That is:

Theoretical bandwidth of the single-tuned circuit $$=\frac{B_r}{\lambda}=B_0$$

and nominal impedance of the single-tuned circuit $$=\lambda R_r=R_0.$$

As will be seen from the above explanation, a single-tuned circuit can be put into the multiple-tuned coupled circuit system, as one element thereof corresponding to the case ($n=\frac{1}{2}$), in connection with the bandwidth and the impedance; and its amplication factor is represented by the following equations.

$$|\tilde{A}|=\frac{g_m R_0}{\sqrt{\lambda^2+4x^2}} \qquad (6)$$

$$\phi=\tan^{-1}\frac{2x}{\lambda} \qquad (7)$$

Figure 3C:
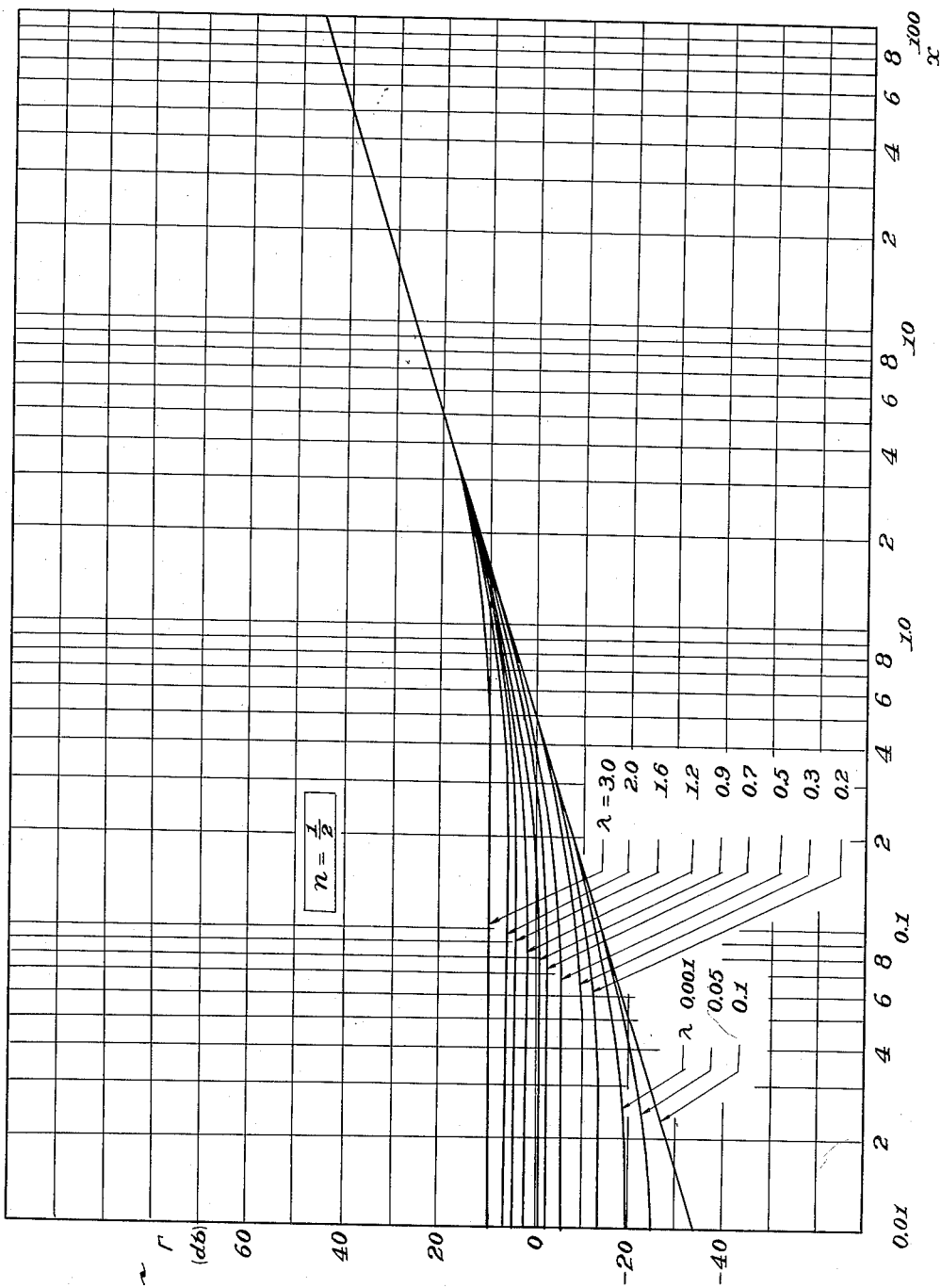
Figure 4C:
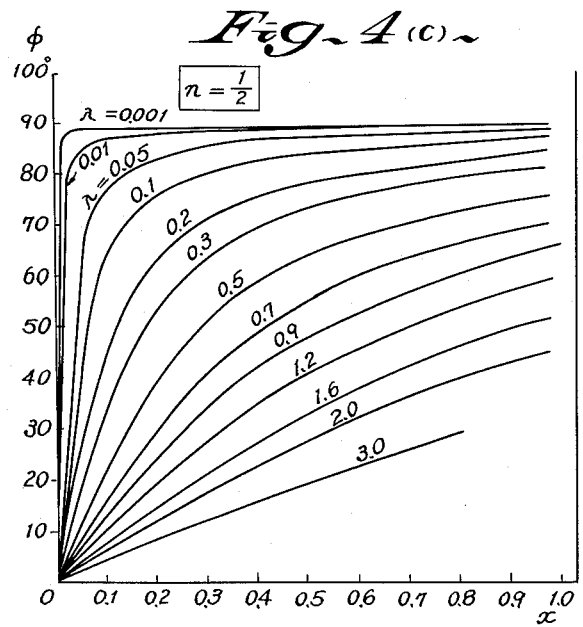
Figure 4B:
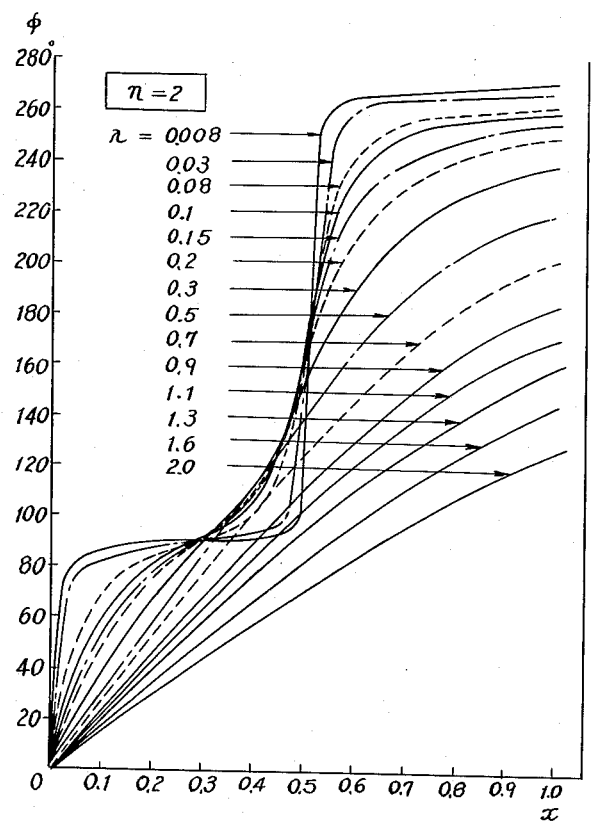

Therefore, its characteristics correspond to the characteristics in FIG. 3(c) and FIG. 4(c) and are equivalent to the case in which $n$ is an even number. Consequently, it is clear that a single-tuned circuit may be regarded as a special case of the multiple-tuned coupled circuit in which $n$ is an even number.

In the example of this invention indicated in FIG. 9, the multiple-tuned coupled circuits of $m$ number are connected, respectively, to vacuum tubes. In this example, it is not always necessary to use only one stage of the vacuum tube and connection of the circuits through vacuum tubes of several stages may be adopted, or the vacuum tube may be an amplifier tube or converter tube. Furthermore, the circuits may be connected through a high impedance element and the like instead of through a vacuum tube.

While I have described particular embodiments of my invention, it will, of course, be understood that I do not intend it to be limited thereto, since many modifications may be made and I, therefore, contemplate by the appended claim to cover all such modifications as fall within the true spirit and scope of my invention.

I claim:

In a transmission network in which a substantially linear phase characteristic for an entire pass-band is obtained by compensation of the phase characteristics of filters therein, a dissipative band-pass filter arrangement comprising, first and second dissipative multi-tuned coupled circuit filters, said first filter comprising, an odd number of identical dissipative double-tuned coupled circuits directly connected in cascade, said second filter comprising an even number of identical dissipative double-tuned coupled circuits directly connected in cascade, the even number corresponding to one of two whole integers which next precede and follow an integer corresponding to said odd number, each of said double-tuned coupled circuits consisting of two like dissipative single-tuned circuits coupled with each other, the first and second filters having substantially alike cut-off frequencies, impedances and loss factors, and means coupling said two filters in cascade.

References Cited in the file of this patent
UNITED STATES PATENTS

| | | |
|---|---|---|
| 1,703,950 | Norton | Apr. 16, 1929 |
| 2,153,857 | Wheeler | Apr. 11, 1939 |
| 2,181,499 | Wheeler | Nov. 28, 1939 |
| 2,710,315 | Tongue | June 7, 1955 |

OTHER REFERENCES

Fukata: Radio Japan, Journal of the Japan Radio Association. Theory on Multiple-tuned Coupled Circuits, 1952. Abstract in English of this article is part of the record of this case, being submitted with paper No. 8.